United States Patent
Boensch et al.

(10) Patent No.: US 8,647,396 B2
(45) Date of Patent: Feb. 11, 2014

(54) PROCESS AND PLANT FOR PRODUCING BIODIESEL

(75) Inventors: Rudolf Boensch, Nackenheim (DE); Eckhard Seidel, Frankfurt am Main (DE); Helmut Saft, Niddatal (DE)

(73) Assignee: Lurgi GmbH, Frankfurt am Main (DE)

( * ) Notice: Subject to any disclaimer, the term of this patent is extended or adjusted under 35 U.S.C. 154(b) by 230 days.

(21) Appl. No.: 13/120,968

(22) PCT Filed: Aug. 21, 2009

(86) PCT No.: PCT/EP2009/006059
§ 371 (c)(1),
(2), (4) Date: Mar. 25, 2011

(87) PCT Pub. No.: WO2010/040428
PCT Pub. Date: Apr. 15, 2010

(65) Prior Publication Data
US 2011/0252697 A1    Oct. 20, 2011

(30) Foreign Application Priority Data

Oct. 10, 2008   (DE) .......................... 10 2008 050 935

(51) Int. Cl.
*C10L 1/18*   (2006.01)
(52) U.S. Cl.
USPC ............... 44/307; 44/388; 210/789; 210/790; 554/175
(58) Field of Classification Search
USPC .............. 44/307, 388; 210/789, 790; 554/175
See application file for complete search history.

(56) References Cited

U.S. PATENT DOCUMENTS

| | | |
|---|---|---|
| 3,933,789 A | 1/1976 | Pegel |
| 4,112,218 A | 9/1978 | Inoue et al. |

(Continued)

FOREIGN PATENT DOCUMENTS

| | | |
|---|---|---|
| AT | 387399 B | 1/1989 |
| DD | 232831 A1 | 2/1986 |

(Continued)

OTHER PUBLICATIONS

W. De Greyt et al., Identification and Removal of Haze in Soy and Palm Biodiesel, 8$^{th}$ AOCS Practical Short Course on Biodiesel: Plant Design, Process Optimization, Quality Assurance, Chemistry and Safety, Nov. 4-5, 2007, Vienna Austria, pp.1-29.

(Continued)

*Primary Examiner* — Cephia D Toomer
(74) *Attorney, Agent, or Firm* — Leydig, Voit & Mayer, Ltd.

(57) ABSTRACT

When producing biodiesel from fats, oils or split fatty acids rich in steryl glycosides, the light phase rich in fatty acid alkyl esters, which is obtained from the transesterification or esterification, is washed with water in a washing column, wherein the suspension layer formed is treated by stirring. In this way, the steryl glycosides are transferred into the light phase of the wash. In a subsequent treatment of the light washer phase with water in an intensive mixer, compact steryl glycoside/fatty acid alkyl ester/water agglomerates are obtained, which can easily be separated by means of centrifugation. From the light phase of centrifugation, on-spec biodiesel is obtained upon further processing by drying and/or filtration.

This process is suitable for processing fats, oils or split fatty acids with a high content of steryl glycosides and avoids the use of auxiliary substances foreign to the process. It is characterized by simplicity of equipment and a low demand for energy.

16 Claims, 1 Drawing Sheet

(56) References Cited

U.S. PATENT DOCUMENTS

| | | | |
|---|---|---|---|
| 8,097,049 B2 * | 1/2012 | Munson et al. | 44/385 |
| 2003/0068425 A1 | 4/2003 | Khare | |
| 2006/0096159 A1 | 5/2006 | Bonsch et al. | |
| 2007/0151146 A1 | 7/2007 | Lee | |
| 2008/0282606 A1 | 11/2008 | Plaza | |

FOREIGN PATENT DOCUMENTS

| | | |
|---|---|---|
| DD | 268682 A1 | 6/1989 |
| DD | 293500 A5 | 9/1991 |
| DE | 2312285 A1 | 9/1973 |
| DE | 2702966 A1 | 3/1978 |
| DE | 4011611 A1 | 10/1991 |
| DE | 10257215 B4 | 12/2005 |
| DE | 102006062417 A1 | 1/2008 |
| EP | 0523767 B1 | 12/1995 |
| FR | 996608 A | 12/1951 |
| FR | 2560210 A1 | 8/1985 |
| GB | 02046758 A | 11/1980 |
| JP | 7062384 A | 3/1995 |
| WO | 8707632 A1 | 12/1987 |
| WO | 03022064 A2 | 3/2003 |
| WO | 2004053036 A1 | 6/2004 |
| WO | 2007076163 A2 | 7/2007 |
| WO | 2008130974 A2 | 10/2008 |

OTHER PUBLICATIONS

European Patent Office, International Search Report in International Patent Application No. PCT/EP2009/006059 (Feb. 1, 2010).

Verleyen et al, "Influence of the vegetable oil refining process on free and esterified sterols", Journal of the American Oil Chemists' Society, (2002) 79: 947-953.

Moreau et al. "The identification and quantification of steryl glucosides in precipitates from commercial biodiesel", Journal of the American Oil Chemists' Society (2008) 85:761-770.

* cited by examiner

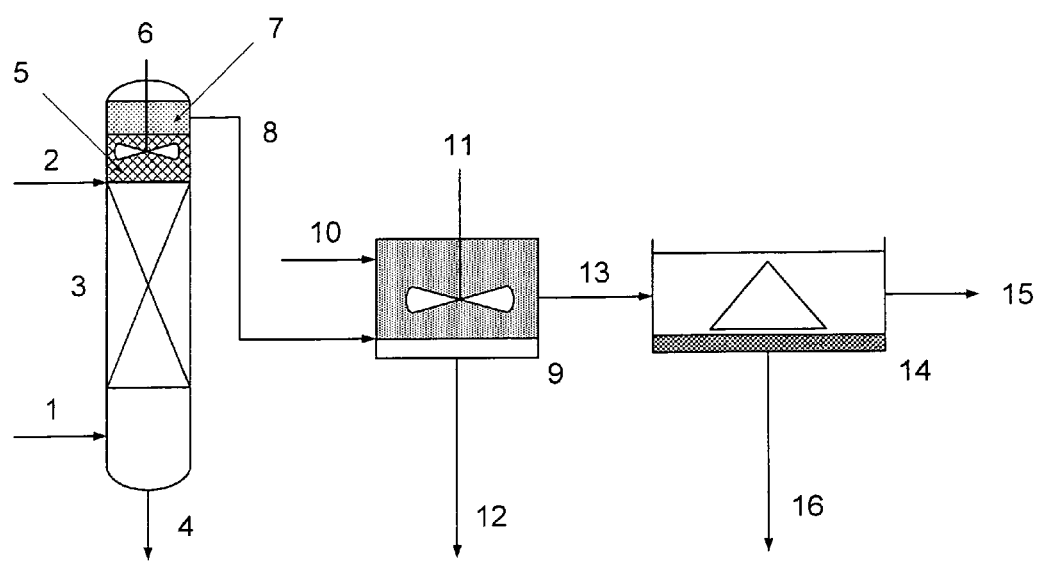

PROCESS AND PLANT FOR PRODUCING BIODIESEL

CROSS-REFERENCE TO PRIOR APPLICATIONS

This application is a U.S. National Phase application under 35 U.S.C. §371 of International Application No. PCT/EP2009/006059, filed on Aug. 21, 2009, and claims benefit to German Patent Application No. DE 10 2008 050 935.3, filed on Oct. 10, 2008. The International Application was published in German on Apr. 15, 2010 as WO 2010/040428 under PCT Article 21(2).

FIELD

The present invention relates to a process for producing biodiesel from fats, oils or split fatty acids containing steryl glycosides and to a plant for performing this process.

BACKGROUND

Biodiesel is produced from animal or vegetable fats, oils or split fatty acids. The raw material currently preferred for biodiesel production in Europe is rapeseed oil. The European patent specification EP 0523767 B1, for instance, describes a process for producing fatty acid methyl ester or fatty acid ethyl ester and glycerol by transesterification of oils or fats, wherein rapeseed oil here is used as raw material. After an optional pretreatment with methanol or ethanol and an alkaline catalyst in liquid phase, the oil or fat is converted to the products fatty acid methyl ester or fatty acid ethyl ester, and glycerol as a byproduct. Advantageously, at least two reaction stages are employed, wherein each reaction stage includes a mixing reactor and a separator for separating a light phase rich in fatty acid alkyl ester and a heavy phase rich in glycerol. The light phase rich in fatty acid alkyl ester is supplied to further processing, which among other things includes washing with water in a washing column.

In North America, large amounts of soybean oil are also used for biodiesel production. In Asia, palm oil or palm olein are used as starting material for the production of biodiesel. All vegetable oils contain significant concentrations of steryl glycosides in dissolved form. These are widely used vegetable ingredients, which from a chemical point of view result from the combination of a carbohydrate (e.g. glucose) with a phytosterol and are also known as sterolins. Phytosterols are vegetable hormones and are constituents of vegetable cell membranes; known representatives include e.g. stigmasterol or campesterol.

The concentration of steryl glycosides in the vegetable oils can vary strongly depending on kind, origin and pretreatment. By way of example, raw soybean oil can contain up to 2300 ppm and palm oil up to 3000 ppm of steryl glycosides, whereas a type of oil poorer in steryl glycosides, such as sunflower oil, only contains about 300 ppm. Rapeseed oil typically contains up to 500 ppm of steryl glycosides, but the content greatly depends on the pretreatment of the oil.

The steryl glycosides also can carry a fatty acid radical, which is bound to a hydroxyl group of the carbohydrate by esterification; this is referred to as acylated steryl glycosides. In the production of biodiesel, the same partly are converted to non-acylated steryl glycosides, whereby their solubility in organic solvents is reduced.

The use of oil types rich in steryl glycosides in the production of biodiesel can lead to the formation of turbidities or precipitates during the subsequent storage of the product at cold ambient temperatures. Since in a conventional washing column, as it is used for instance in the production of biodiesel from rapeseed oil, steryl glycosides cannot be removed due to their poor solubility in water, obstructions may occur there as a result of the formation of precipitates rich in steryl glycosides. In the succeeding process steps, the steryl glycosides can lead to deposits in the heat exchangers of the driers and clog filters. The biodiesel produced is not on specification, since the specified value for overall pollution is not complied with. Processing such oils therefore requires an increased maintenance effort for the production plant. Furthermore, as a result of the necessary shut-down of the production plant or its parts for maintenance purposes, the availability and hence productivity of the production plant is restricted. The precipitates can be removed by mechanical methods such as filtration or centrifugation, possibly also in combination.

The addition of an adsorbent or filtration aid for separating steryl glycosides from biodiesel and for the subsequent removal thereof by means of filtration, centrifugation or combinations thereof is described in the patent specification WO 2007/076163 A2. It is disadvantageous here that this treatment only is possible in a simple way for the finished biodiesel product. What is furthermore disadvantageous is the use of large amounts of solid filtration or adsorption aids and the resulting production of large amounts of solid wastes. As a further option, the distillative purification of biodiesel is mentioned in this patent specification, since the steryl glycosides have a considerably higher boiling point than fatty acid alkyl esters. However, this option involves a higher expenditure of equipment and a very high expenditure of energy, since the entire fatty acid alkyl ester must be removed by distillation as a low boiler.

SUMMARY

In an embodiment, the present invention provides a process for producing biodiesel from fats, oils or split fatty acids containing steryl glycosides, wherein the fats, oils or split fatty acids are reacted with short-chain alkanols in the presence of a catalyst by transesterification or esterification to a fatty acid alkyl ester so as to obtain a first product stream rich in the fatty acid alkyl ester as a first light phase of a first liquid-liquid phase separation. The first product stream is washed with water in a washing device, so as to form a suspension layer on a phase boundary layer between a heavy phase rich in water and the first light phase rich in the fatty acid alkyl ester. The suspension layer including the steryl glycosides, the fatty acid alkyl ester and water is treated by introducing kinetic energy. A second product stream is withdrawn from the first light phase as a second light phase which contains the steryl glycosides in at least one of a homogeneously dissolved form, a colloidally dissolved form and a finely dispersed form of steryl glycoside/fatty acid alkyl ester/water agglomerates. The second product stream is intensively mixed with water so as to obtain a third product stream as a third light phase of a second liquid-liquid phase separation, the third product stream including steryl glycoside/fatty acid alkyl ester/water agglomerates which are separable from the third product stream by a mechanical separation. The mechanical separation is performed on the third product stream so as to provide a fourth product stream and a fifth product stream. The fourth product stream is withdrawn from the mechanical separation as a fourth light phase. The fifth product stream is withdrawn from the mechanical separation as a heavy phase enriched in steryl glycosides. A product conditioning is performed on the fourth product stream so as to obtain on-spec biodiesel.

BRIEF DESCRIPTION OF THE DRAWING

The present invention will be described in even greater detail below based on the exemplary FIGURE. The invention is not limited to the exemplary embodiment. Other features and advantages of various embodiments of the present invention will become apparent by reading the following detailed description with reference to the attached drawing which illustrates the following:

FIG. 1 schematically shows a plant for producing biodiesel from fats, oils or split fatty acids containing steryl glycosides in accordance with an embodiment of the present invention.

Therefore, it is an aspect of the present invention to avoid the above-mentioned disadvantages and provide a more economic and technically simpler process for producing biodiesel by using fats, oils or split fatty acids rich in steryl glycosides, which avoids the use of auxiliary substances foreign to the process or energy-intensive separation processes, and simplifies the equipment.

According to an embodiment of the present invention, the transesterification of fats, oils or the esterification of split fatty acids, which contain steryl glycosides, with short-chain alkanols in the presence of a catalyst and subsequent liquid-liquid phase separation provides a first product stream rich in fatty acid alkyl ester, which subsequently is washed with water in a washing device. In accordance with a preferred embodiment of the invention, washing with water is countercurrently performed in a washing column equipped with structured packings or random packings. At the phase boundary layer between the heavy phase rich in water and the light phase rich in fatty acid alkyl ester, a suspension layer is formed, which contains large-volume agglomerates of steryl glycosides, fatty acid alkyl ester and water, wherein these agglomerates can contain 10 to 70 times the amount of water and 30 to 90 times the amount of fatty acid alkyl ester, each calculated as percent by weight. Surprisingly, it was found out that the separation of steryl glycosides can be improved if the suspension layer is not withdrawn (in contrast, the suspension layer is typically withdrawn) from the washing column at the place of its formation via a side stream and discarded. In this way, only part of the steryl glycosides would be removed, and there would be losses of fatty acid alkyl ester. The suspension layer rather is treated in accordance with the invention by introducing kinetic energy, in a preferred aspect of the invention by stirring. Alternatively, the kinetic energy can, however, also be introduced by jet mixing or by using an ultrasound source. In this way, turbulent mixing of the suspension layer and a reduction in size of the agglomerates is achieved by releasing water in the heavy phase and releasing fatty acid alkyl esters in the light phase. From the suspension layer, steryl glycosides in homogeneously dissolved form, in colloidally dissolved form or in the form of finely dispersed steryl glycoside/fatty acid alkyl ester/water agglomerates pass into the light phase. Alternatively, the treatment of the suspension layer by introducing kinetic energy can also be effected in an external container.

From the light phase enriched in this way with steryl glycosides, a second product stream is withdrawn and introduced into at least one further treatment stage, in which it is intensively mixed with water, whereby upon liquid-liquid phase separation a third product stream is obtained as light phase, which contains steryl glycoside/fatty acid alkyl ester/water agglomerates which can be separated by means of mechanical separation methods. In accordance with an embodiment of the present invention, the agglomerates are separated by means of centrifugation. The fourth product stream obtained as light phase from the mechanical separation method upon phase separation is largely free from steryl glycosides and mostly contains fatty acid alkyl ester. Subsequently, it is supplied to a product conditioning, which preferably comprises drying or filtration, or both. In this way, on-spec biodiesel is obtained.

From the mechanical separation method, a fifth product stream rich in steryl glycosides is obtained as heavy phase. In accordance with an embodiment of the present invention, it is further processed to obtain a thickened sludge containing steryl glycosides, which is supplied to disposal or further usage. Steryl glycosides are used for instance in the production of pharmaceutical preparations.

In accordance with an embodiment of the present invention, methanol or ethanol or both are used in the transesterification of the fats or oils or in the esterification of the split fatty acids as alkanols, whereby fatty acid methyl ester or fatty acid ethyl ester are obtained.

According to an embodiment, the present invention provides a plant for producing biodiesel from fats, oils or split fatty acids containing steryl glycosides, which is suitable for performing the process described above. In an embodiment, the plant includes:

at least one reaction stage in which fats or oils or split fatty acids containing steryl glycosides are reacted with short-chain alkanols in the presence of a catalyst to obtain fatty acid alkyl ester by transesterification or esterification, and upon liquid-liquid phase separation a first product stream rich in fatty acid alkyl ester is obtained as light phase, a washing column, to which the first product stream is supplied and in which it is washed with water, wherein a second product stream is obtained as light phase, at least one mixer, to which the second product stream is supplied and is intensively mixed there with water, wherein upon liquid-liquid phase separation a third product stream is obtained as light phase, and a mechanical separating device, to which the third product stream is supplied and from which a fourth product stream is obtained as light phase upon phase separation, which is supplied to a product conditioning, whereby on-spec biodiesel is obtained, and from which a fifth product stream enriched in steryl glycosides is obtained as heavy phase, which is withdrawn and is supplied to disposal or further usage upon further processing.

In a preferred embodiment of the plant, counterflow operation of the washing column and its equipment with structured packings or random packings as separating elements is provided.

In a further preferred embodiment of the plant, the mechanical separating device is configured as centrifuge.

Further developments, advantages and possible applications of the invention can also be taken from the following description of embodiments and the drawing. All features described and/or illustrated form the invention per se or in any combination, independent of their inclusion in the claims or their back-reference.

In a reaction part, fats, oils or split fatty acids containing steryl glycosides are reacted with short-chain alkanols, preferably methanol, in the presence of a basic catalyst by transesterification or esterification to fatty acid alkyl ester, wherein by subsequent liquid-liquid phase separation a first product stream rich in fatty acid alkyl esters is obtained as light phase.

This first product stream largely completely contains the steryl glycosides contained in the fat, oil or in the split fatty acid.

Via conduit (1), the first product stream is supplied to the washing column (3) and charged to the same in the lower portion. The washing column is equipped with suitable random packings as separating elements. The inlet temperature of the first product stream is between 20 and 60° C. Via a water conduit (2), water is charged to the washing column as washing agent with a temperature of 10 to 40° C. above the packing layer and is withdrawn via conduit (4) below the level of addition of conduit (1).

During the washing process, steryl glycoside/fatty acid alkyl ester/water agglomerates are formed, which are accumulated as suspension layer (5) on the phase boundary layer between the heavy phase rich in water and the light phase rich in fatty acid alkyl ester. The water column in the washing column and the position of the water inlet advantageously are chosen such that the suspension layer is located above the packing layer and above the level of addition of the water conduit (2). The agglomerates contained in the suspension layer are coarsely dispersed and contain major amounts of enclosed water and fatty acid alkyl ester. The more the suspension layer grows, the more compact it becomes and the more it impedes the further ascension of fatty acid alkyl ester from the column into the upper phase. In accordance with an embodiment of the present invention, the suspension layer is stirred with a stirrer (6), which advantageously is configured as propeller stirrer or blade stirrer or combinations thereof. Due to stirring, water and fatty acid alkyl ester are released from the coarsely dispersed agglomerates, and steryl glycosides in homogeneously dissolved form, in colloidally dissolved form or in the form of finely dispersed steryl glycoside/fatty acid alkyl ester/water agglomerates, pass into the light phase (7). The same is withdrawn as a second product stream via conduit (8) and supplied to the mixer (9). In the mixer, the second product stream is mixed with a defined amount of water of 0.2 to 4 wt-%, which is supplied via a water conduit (10).

In the mixer (9), thorough mixing of the two phases is effected with an intensive stirrer (11). In the phase rich in fatty acid alkyl ester, still homogeneously or colloidally dissolved steryl glycosides thereby are transferred into compact steryl glycoside/fatty acid alkyl ester/water agglomerates, which due to their higher density can easily be separated by means of a mechanical separation method, but remain dispersed in the mixer due to turbulent mixing. A third product stream rich in fatty acid alkyl ester is obtained as light phase of a liquid-liquid phase separation, which is indicated in the FIGURE. The light phase contains the dispersed agglomerates. Waste water is withdrawn as heavy phase via conduit (12).

The third product stream, which contains the compact steryl glycoside/fatty acid alkyl ester/water agglomerates, is supplied to a centrifuge (14) via a conduit (13). Separation here is effected due to the density differences between the compact steryl glycoside/fatty acid alkyl ester/water agglomerates and the light phase rich in fatty acid alkyl ester. Via conduit (15), a fourth product stream is withdrawn from the centrifuge as light phase, which is largely liberated from steryl glycosides, and is supplied to the further processing including drying and/or filtration, from which on-spec biodiesel is obtained. As heavy phase of the centrifugation, a fifth product stream rich in steryl glycosides is obtained via conduit (16), which advantageously is further thickened and supplied to disposal or further usage as thickened sludge.

Thus, an economic process for producing biodiesel from fats, oils or split fatty acids containing steryl glycosides is proposed with the invention. In contrast to the prior art, no auxiliary substances foreign to the process are used, which subsequently must be removed from the process and be discarded. Furthermore, the process, according to an embodiment of the present invention, achieves simplicity of equipment and a low demand for energy. With this process, a broad spectrum of fats, oils or split fatty acids containing steryl glycosides can be processed to biodiesel. In principle, all edible oils and non-edible oils can be used as feedstocks. Preferably, soybean oil, palm oil, palm olein, rapeseed oil, jatropha oil, sunflower oil, algae oil or mixtures of these oils are used. Mixtures of vegetable oils with animal fats can also be used.

EXAMPLES

To illustrate the economy and technical feasibility of the process, the following examples are given, which demonstrate the advantages of the process of the invention, according to an embodiment thereof, as compared to a prior art process.

Example 1

Prior Art

For the continuous production of biodiesel, palm oil with a mass flow rate of 2.5 kg/h and catalyst (sodium methylate, 0.5 wt-% based on the amount of oil used and methanol with 1.5 times the molar excess of oil) were supplied to the transesterification. The reaction part consisted of two series-connected stirred reactors and liquid-liquid phase separators with a liquid volume of about 3.8 l per stage, in order to ensure a residence time of 90 minutes for each reaction step. To prevent back mixing or a breakthrough of oil, each of the stirred reactors was configured as a three-stage stirred-tank cascade. For input of the respectively required heat of reaction, the reactors were configured as double-walled glass vessels and heated by means of a water-filled thermostat. The liquid-liquid phase separators were configured as lying glass cylinders with separate outlets for the light fatty acid methyl ester phase and the heavy glycerol phase. The adjustment of the desired temperature profile was realized by an externally mounted electric trace heating. 50% of the amount of catalyst and methanol were added to the first stirred reactor, in order to achieve a degree of transesterification of 80% at a reaction temperature of 40 to 65° C., the reaction taking place by alcohol limitation. To achieve the final conversion, a stoichiometric excess of methanol was supplied to the second stirred reactor. The non-reacted methanol and about 90% of the catalyst were separated from the fatty acid alkyl ester phase with the glycerol. To neutralize the catalyst residues, 1 wt-% of a 3% hydrochloric acid were added to the ester by means of an intensive mixer. For further processing, the now acid crude ester was supplied to a washing column counter-currently operated with water as washing agent. At the phase interface between heavy water phase and light ester phase, a constantly growing suspension layer was formed, which solidified during its further growth and assumed a sludge-like consistency. This resulted in clogging of the washing column, blockage of the water inlet and drainage of the ester phase; the production of biodiesel therefore had to be interrupted.

Example 2

Process of the Present Invention

The procedure was as described in Example 1, but the following measures were taken in addition:

To ensure an unimpeded addition of water, the inflow of water to the washing column was positioned above the packing layer and below the phase interface or the suspension layer.

The column head of the washing column was equipped with a stirrer, which could be adjusted variably from 30 to 120 rpm.

It could now be observed that water adhering when stirring the suspension layer was detached from the sludge particles and drained into the heavy phase. Furthermore, it could be recognized that the sludge particles were homogenized and constantly discharged from the washing column with the ester phase. There was no clogging or blockage of the washing column. The sludge particles were analytically identified as steryl glycoside/fatty acid alkyl ester/water agglomerates. The ester phase was mixed with fresh water of 40° C. (3 wt-%) by means of an intensive mixer and at the same temperature subsequently supplied to a centrifuge, in which a heavy sludge phase containing water was separated. The fatty acid methyl ester obtained as light phase of the centrifugation was clear and had a water content of about 1000 ppm. On-spec biodiesel could be obtained therefrom by drying.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 1 conduit
2 water conduit
3 washing column
4 waste water conduit
5 suspension phase
6 stirrer
7 light phase
8 conduit
9 mixer
10 water conduit
11 intensive stirrer
12 conduit
13 conduit
14 centrifuge
15 conduit
16 conduit

The invention claimed is:

1. A process for producing biodiesel from a fat, oil or split fatty acid comprising a steryl glycoside, the process comprising:
   a) transesterifying or esterifying the fat, oil, or split fatty acid with a short-chain alkanol, in the presence of a catalyst to obtain the fatty acid alkyl ester in a first product stream;
   b) washing the first product stream with water in a washing device, so as to form a suspension layer which comprises the steryl glycoside, the fatty acid alkyl ester, and water on a boundary layer between a heavy phase comprising water and a first light phase comprising the fatty acid alkyl ester, in a first liquid-liquid phase separation;
   c) introducing kinetic energy into the suspension layer, such that the steryl glycoside, fatty acid alkyl ester, and water pass into the first light phase;
   d) withdrawing a second product stream from the first light phase as a second light phase comprising the steryl glycoside in at least one of a homogeneously dissolved form, a colloidally dissolved form, and a finely dispersed form of steryl glycoside/fatty acid alkyl ester/water agglomerates;
   e) intensively mixing the second product stream with water, so as to obtain a third product stream as a third light phase of a second liquid-liquid phase separation, the third product stream comprising steryl glycoside/fatty acid alkyl ester/water agglomerates which are separable from the third product stream by a mechanical separation;
   f) performing the mechanical separation of the third product stream, so as to provide a fourth product stream and a fifth product stream;
   g) withdrawing the fourth product stream from the mechanical separation as a fourth light phase;
   h) withdrawing the fifth product stream from the mechanical separation as a heavy phase enriched in the steryl glycoside; and
   i) performing a product conditioning on the fourth product stream so as to obtain on-spec biodiesel.

2. The process according to claim 1, wherein the washing device includes a washing column which is operated with opposing currents and structured packings as separating elements.

3. The process according to claim 1, wherein the introducing of the kinetic energy is performed by stirring.

4. The process according to claim 1, wherein the mechanical separation is performed using centrifugation.

5. The process according to claim 1, wherein the product conditioning is performed using drying.

6. The process according to claim 1, further comprising:
   processing the fifth product stream to a thickened sludge comprising the steryl glycoside; and
   supplying the thickened sludge for at least one of disposal and further usage.

7. The process according to claim 1, wherein the alkanol comprises methanol.

8. The process according to claim 1, wherein the product conditioning is performed using filtration.

9. The process according to claim 1, wherein the product conditioning is performed using drying and filtration.

10. The process according to claim 1, wherein the alkanol comprises ethanol.

11. The process according to claim 1, wherein the alkanol comprises methanol and ethanol.

12. The process according to claim 1, wherein the washing device includes
   a washing column which is operated with opposing currents, and
   random packings as separating elements.

13. The process according to claim 1, wherein the washing device includes
   a washing column which is operated with opposing currents, and
   structured packings and random packings as separating elements.

14. The process according to claim 1, wherein the second light phase comprises the steryl glycoside in the homogeneously dissolved form.

15. The process according to claim 1, wherein the second light phase comprises the steryl glycoside in the colloidally dissolved form.

16. The process according to claim 1, wherein the second light phase comprises the steryl glycoside in the finely dispersed form.

* * * * *